United States Patent [19]

Agins

[11] Patent Number: 4,831,904
[45] Date of Patent: May 23, 1989

[54] DISC BRAKE TOOL

[76] Inventor: Ron Agins, 7935 Chapel Way Dr., Mentor, Ohio 44060

[21] Appl. No.: 145,416

[22] Filed: Jan. 19, 1988

[51] Int. Cl.⁴ .............................................. B25B 13/48
[52] U.S. Cl. .................................... 81/176.15; 81/488
[58] Field of Search .................. 81/176.1, 176.15, 488; 188/196 M; 7/100

[56] References Cited

U.S. PATENT DOCUMENTS

| | | | |
|---|---|---|---|
| 2,640,382 | 6/1953 | Grossman | 7/100 |
| 4,061,058 | 12/1977 | Douglas | 7/100 |
| 4,136,587 | 1/1979 | Howard | 7/100 |
| 4,237,755 | 12/1980 | Cunnell | 81/176.15 |
| 4,572,040 | 2/1986 | Metz | 7/100 |
| 4,625,353 | 12/1986 | Tamez | 7/100 |

FOREIGN PATENT DOCUMENTS

| | | | |
|---|---|---|---|
| 157750 | 1/1953 | Australia | 81/176.15 |
| 1396805 | 6/1975 | United Kingdom | 81/176.15 |

Primary Examiner—Roscoe V. Parker
Attorney, Agent, or Firm—Leon Gilden

[57] ABSTRACT

A disc brake tool as set forth for rotatably manipulating a piston associated with a conventional disc brake caliper assembly. A support platen has secured thereto, on a first surface, a torque transmitting projection formed in a hexagonal configuration where a second surface of the support platen includes a plurality of removably secured Allen wrench projections for cooperating with the aforenoted piston associated with a disc brake caliper.

6 Claims, 3 Drawing Sheets

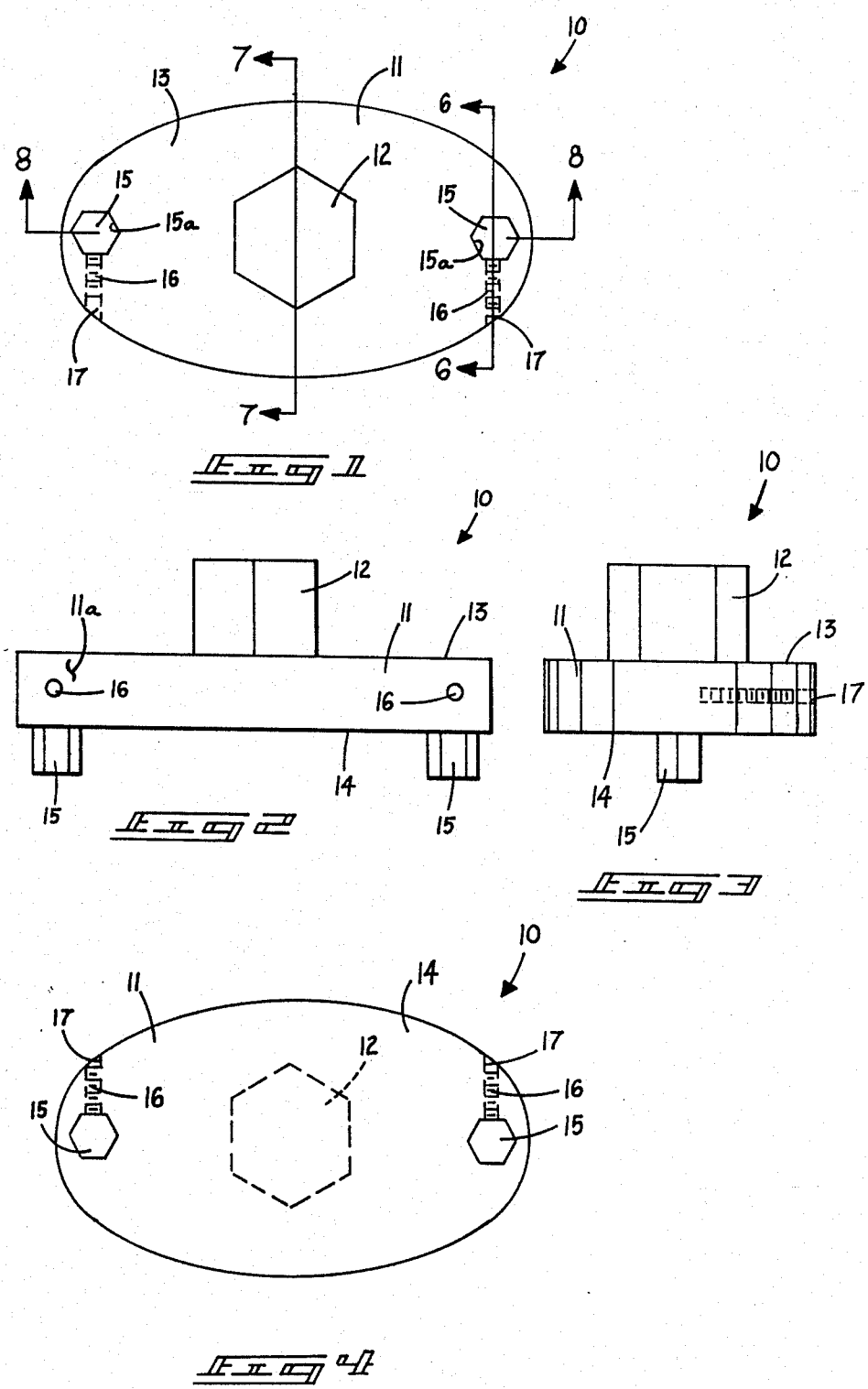

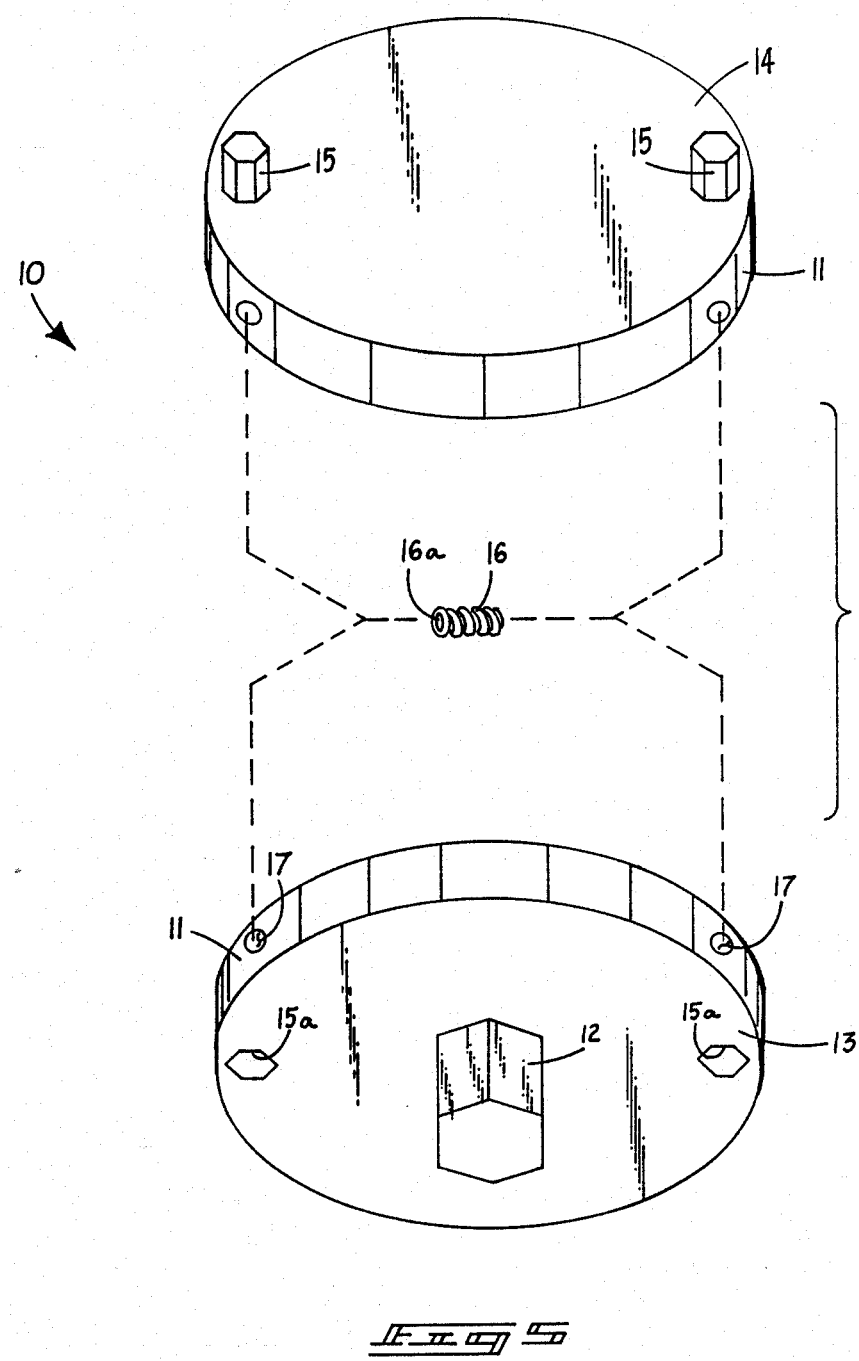

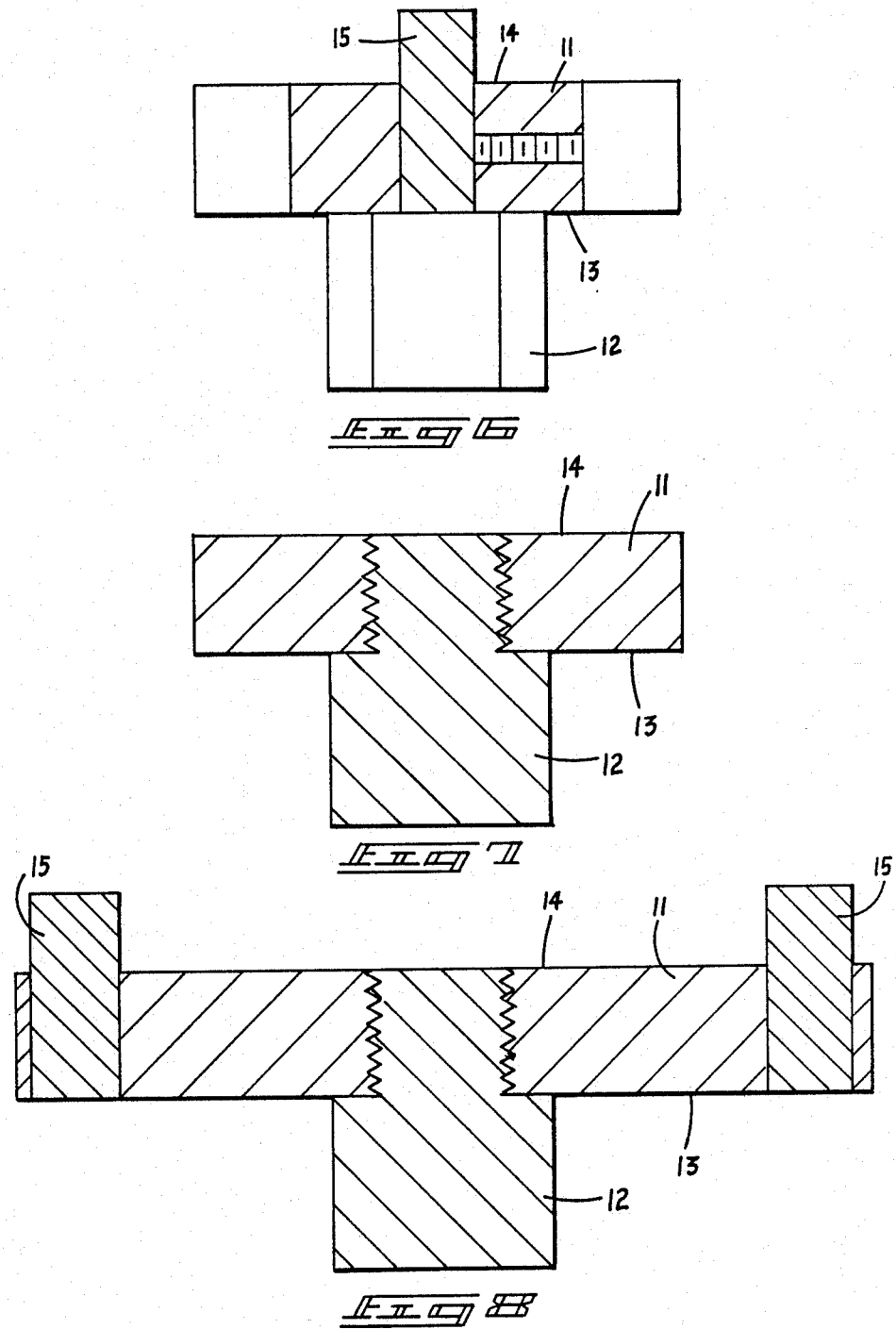

DISC BRAKE TOOL

BACKGROUND OF THE INVENTION

1. Field of the Invention

The present invention relates to brake tools, and more particularly pertains to a new and improved disc brake tool which cooperates with a disc brake caliper for rotatably assembling and disassembling same minimizing damage thereby to the caliper assembly.

2. Description of the Prior Art

The use of brake tools and the like is well known in the prior art. As may be appreciated, however, these devices have not presented a compact tool for specialized use with a disc brake piston, as conventionally associated with a caliper. Various specialized tools for associated specialized applications have been developed as for example, U.S. Pat. No. 2,640,382 to Grossman wherein a manually manipulatable wrench has formed therein an underlying wedge with associated ribs for securement of a drain plug and the like for rotative manipulation of the same.

U.S. Pat. No. 4,061,058 to Douglas sets forth a locking hub tool including a central elongate member with a plurality of projections orthogonally secured thereto for the locking and unlocking of hubs as associated commonly with four-wheel drive vehicles.

U.S. Pat. No. 4,136,587 to Howard sets forth a power-piston screw jack for raising the power piston of a diesel engine's control governor. The jack contains a brake joint, which in its fully operative clamping position may be rendered instantly inoperative by applying an orthogonal impact force to the joint.

U.S. Pat. No. 4,572,040 to Metz sets forth a tool for adjusting brakes on automotive trailers and the like including impact means for releasing frozen studs and the like.

U.S. Pat. No. 4,625,353 to Tamez et al. sets forth a brake tool adjusting mechanism wherein a lever includes a spanner at one end per manually manipulating an actuating arm between and inoperative and operative orientation. Essentially the tool sets forth a selectively operative combination of sockets in association with a manipulating arm, as need.

As such, it may be appreciated that there is continuing need for a new and improved disc brake tool which addresses both the problem of compactness and effectiveness, and in this respect the present invention substantially fulfills this need.

SUMMARY OF THE INVENTION

In view of the foregoing disadvantages inherent in the known types of disk brake tools now present in the prior art, the present invention provides an disc brake tool wherein the same may be compactly and efficiently stored when not in use and may be further easily and efficiently positioned and operated during periods of need. As such, the general purpose of the present invention, which will be described subsequently in greater detail, is to provide a new and improved disc brake tool which has all the advantages of the prior art disc brake tools and none of the disadvantages.

To attain this, the present invention comprises a disk brake tool which may be compactly stored or selectively presented to a piston of an associated caliper apparatus for removal or replacement of same. A central platen has formed thereto a first torque transmitting projection generally formed of hexagonal configuration with a second side of the platen formed with a plurality of replaceable Allen wrench projection for interengaging a piston caliper of a disc brake assembly.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved disc brake tool which has all the advantages of the prior art disc brake tools and none of the disadvantages.

It is another object of the present invention to provide a new and improved disc brake tool which may be easily and efficiently manufactured and marketed.

It is a further object of the present invention to provide a new and improved disc brake tool which is of a durable and reliable construction.

An even further object of the present invention is to provide a new and improved disc brake tool which is susceptible of a low cost of manufacture with regard to both materials and labor, and which accordingly is then susceptible of low prices of sale to the consuming public, thereby making such disk brake tools economically available to the buying public.

Still yet another object of the present invention is to provide a new and improved disc brake tool which provides in the apparatuses and methods of the prior art some of the advantages thereof, while simultaneously overcoming some of the disadvantages normally associated therewith.

Still another object of the present invention is to provide a new and improved disc brake tool formed with a torque transmitting portion on one side of a central platen and a plurality of Allen head projections replaceably positioned within said platen projecting orthogonally of the other side.

Even still another object of the present invention is to provide a new and improved disc brake tool which may be compactly presented to a piston of an associated disk brake caliper assembly for rotatably manipulating said piston.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top orthographic view of the disc brake tool of the instant invention.

FIG. 2 is side orthographic view of the disc brake tool of the instant invention.

FIG. 3 is an end orthographic view of the disc brake tool of the instant invention.

FIG. 4 is bottom orthographic view of the disc brake tool of the instant invention.

FIG. 5 is an isometric expanded view of the disc brake tool of the instant invention illustrating the first and second rotated surfaces of the platen securing thereto the torque transmitting projection and the Allen wrench projections.

FIG. 6 is an orthographic side view of the disc brake tool of the instant invention taken along the lines 6—6 of FIG. 1 in the direction indicated by the arrows.

FIG. 7 is a side orthographic view of the disc brake tool of the instant invention taken along the lines 7—7 of FIG. 1 in the direction indicated by the arrows.

FIG. 8 is a side orthographic view of the disc brake tool of the instant invention taken along the lines 8—8 of FIG. 1 in the direction indicated by the arrows.

DESCRIPTION OF THE PREFERRED EMBODIMENT

With reference now to the drawings, and in particular to FIGS. 1 to 8 thereof, a new and improved disc brake tool embodying the principles and concepts of the present invention and generally designated by the reference numeral 10 will be described.

More specifically, it will noted that the disc brake tool 10 essentially comprises a central platen 11 formed with a first planar side 13 and a second planar side 14. First planar side 13 has secured thereto a torque transmitting projection 12 advantageously configured of hexagonal dimensions for association with the conventional torquing tools, such as sockets, wrenches and the like. Platen 11 is formed of a generally ellipsoidal configuration, as viewed in FIGS. 1 and 4 for example, for compactness of dimension and yet maintaining adequate webbing strength, within platen 11, for transmitting torque through the various projections and maintaining configurational integrity of the disc brake tool 10 by minimizing deflection of platen 11 in use.

The second planar side 14 of platen 11 has projecting elongate hexagonal projections 15, such as an Allen wrench extension, formed within openings 15a of complementary configuration for slidingly accepting the hexagonal projections 15 therethrough. The openings 15a are formed entirely through the width of platen 11 to enable adjustment of hexagonal projections 15 with respect to the second planar side 14. Set screws 16 are utilized to lock the projections 15 in a desired orientation with respective platen 11 and are positioned within bores 17 formed within the side surface 11a of platen 11.

In use, a disc brake piston associated with a caliper to be rotatably accepted therein, enables disc brake tool 10 to be positioned therein. Hexagonal projections 15 register with a piston of a disc brake assembly whereupon the piston may be rotatably manipulated by an accepting bore within an associated caliper. By torquing of torque transmitting projection 12, a disc brake piston may be selectively secured a piston within a disc brake caliper assembly or alternatively removed therefrom, if desired.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A disc brake torque application tool for rotatably manipulating a disc brake piston comprising,
   an elongated platen means including a first and second planar side with a torque transmitting projection integrally projecting upwardly from the first planar side, and
   a plurality of projection means slidably secured to and projecting outwardly of said second planar side, and
   a plurality of fastening means associated with said projection means for securing said projection means in a pre-selected orientation relative to said second planar side.

2. A disc brake tool as set forth in claim 1 wherein said platen means is formed in an elliptical shape for providing enhanced rigidity with a minimum of surface area.

3. A disc brake tool as set forth in claim 1 wherein said torque transmitting projection is formed in an hexagonal configuration for utilization with conventional sockets and wrenches.

4. A disc brake tool as set forth in claim 3 wherein said projection means are formed of hexagonal configurations for association with a disc brake piston.

5. A disc brake tool as set forth in claim 4 wherein said fastening means are formed as set screws securable onto a flat of said hexagonal projection means wherein said platen has formed therein a plurality of bores for threadedly accepting said fastening means.

6. A disc brake tool as set forth in claim 5 wherein a plurality of hexagonal bores are orthogonally formed at terminal ends of said platen means for accepting in complementary relationship said projection means enabling said projections means to be adjustably positionable within said bores.

* * * * *